Nov. 13, 1956    L. PATNAUDE    2,770,483
HAND WEED PICKER
Filed Dec. 14, 1953

Leo Patnaude
INVENTOR.

BY
Attorneys

United States Patent Office 2,770,483
Patented Nov. 13, 1956

2,770,483

HAND WEED PICKER

Leo Patnaude, Fairhaven, Mass., assignor of fifty percent to Helen M. Patnaude, Fairhaven, Mass.

Application December 14, 1953, Serial No. 398,024

1 Claim. (Cl. 294—50.9)

This invention relates to a hand weed picker and more particularly to an implement designed to be used in removing weeds from gardens and wherein the operator thereof can remain in a standing position.

An object of this invention is to provide a hand weed picker having a gripping means at one end of a handle and operating means for the gripping means at the other end of the handle.

Another object of this invention is to provide a hand weed picker which is provided with means for loosening the dirt around the weeds to be removed.

A further object of this invention is to provide a hand weed picker which is easily operated by an operator using one hand only.

A still further object of this invention is to provide a hand weed picker which is simple and efficient in construction, of relatively light weight, and durable and lasting in use.

Figure 1:
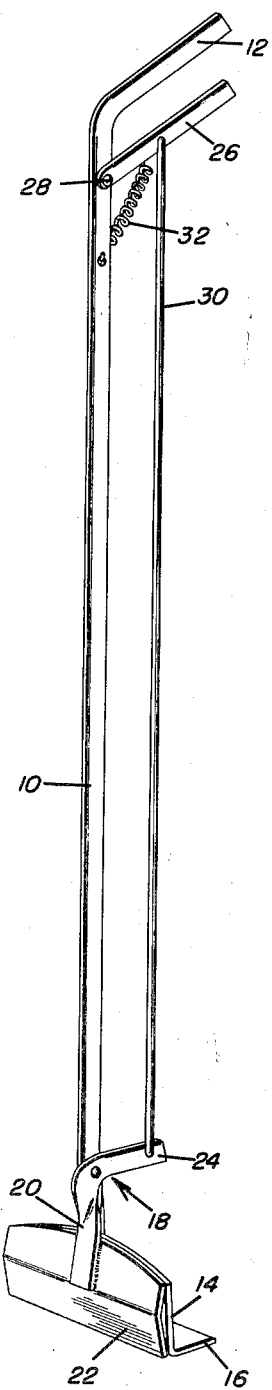
Figure 2:
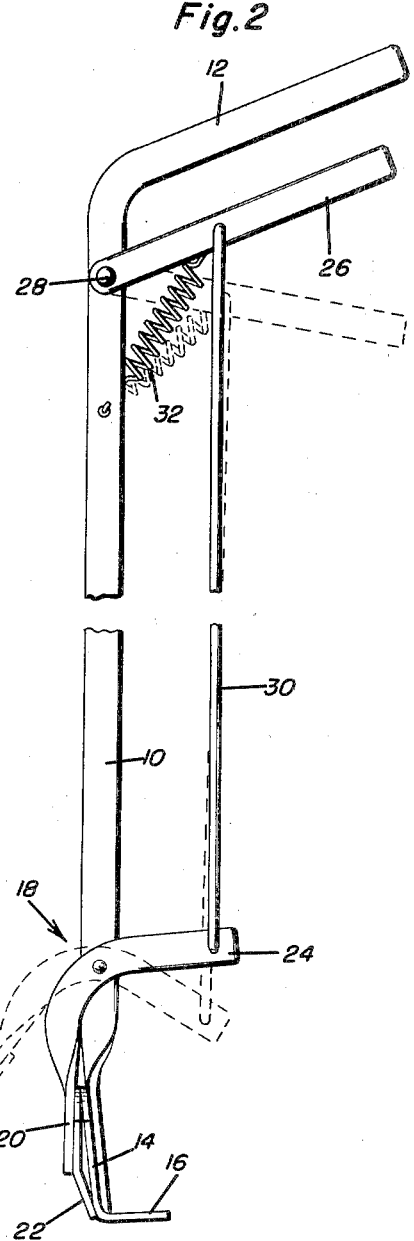

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view showing the hand weed picker forming the subject of this invention; and Figure 2 is a side elevational view with parts broken away of the hand weed picker forming the subject of this invention.

Referring now more specifically to the accompanying drawings, it will be seen that the improved hand weed picker forming the subject of this invention includes an elongated handle 10. The handle 10 is provided with an offset portion 12 at one end thereof constituting a hand grip. Secured to the other end of the handle 10 is an elongated stationary jaw 14 extending endwise transversely of the handle 10. The end of the jaw 14 is provided with a flange 16 extending in the direction of hand grip 12. The flange 16 serves as a hoe for loosening the earth around the weeds to be pulled as well as a hoe for loosening the earth around the plants of the garden.

The handle 10 is provided with a member 18 pivotally secured thereto adjacent the stationary jaw 14. The member 18 is L-shaped, or angular, and is pivoted at the angle thereof and has a portion 20 extending parallel to the handle 10 and in a direction toward the stationary jaw 14. Fixedly secured to the portion 20 is an elongated movable jaw 22 extending endwise transversely of the handle 10. The movable jaw 22 is bent along a longitudinal line transverse to the longitudinal axis of the handle 10 whereby the movable jaw is obtuse angle in cross section and whereby the lower edge of movable jaw 22 engages the lower edge of stationary jaw 14.

The member 18 is provided with a portion 24 extending transverse to the longitudinal axis of the handle 10. Secured to the other end of handle 10 adjacent the hand grip 12 is a lever 26. The lever 26 is pivotally mounted on the handle 10 by means of a pivot pin 28. A link 30 is pivotally connected at one end to the lever 26 intermediate its ends. The other end of the link 30 is pivotally secured to the free end of portion 24 of member 18. A coil spring 32 is connected to the lever 26 adjacent the connection of link 30 thereto and is secured at its other end to the handle 10 at a point spaced from the connection of lever 26 thereto in the direction of stationary jaw 14.

In practical use, the spring 32 will urge the movable jaw 22 away from the stationary jaw 14. The operator of the hand weed picker places the device with the movable jaw on one side of a weed and the stationary jaw on the other side of the weed. Then, by moving the lever 26 toward the hand grip 12, the movable jaw 22 will be uregd against the stationary jaw 14, gripping the weed. Then by lifting the device, the weed will be removed from the ground. In some instances, it is desirable to loosen the earth around the weed before removing the weed from the ground. In such a case, the flange 16 is used to soften the earth.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A hand weed picker comprising a handle, an elongated stationary jaw mounted at one end of the handle and extending endwise transversely thereof, an angular member pivotally secured at its angle to said handle adjacent said jaw, said member having one portion thereof extending lengthwise of said handle in the direction of said stationary jaw, an elongated movable jaw secured to said one portion and extending endwise transversely of the handle and movable by said portion into engagement with said stationary jaw, said movable jaw being of obtuse angle shape in cross section, said member having a second portion thereof extending transverse to said handle and means mounted adjacent the other end of said handle and connected to an end of said second portion of said member for moving said member whereby said movable jaw will be moved toward and away from one side of said stationary jaw, said stationary jaw having a longitudinal bottom edge flange on its opposite side extending laterally away from both jaws for fulcruming on the ground to lift both jaws for lifting weeds out of the ground.

References Cited in the file of this patent

UNITED STATES PATENTS

| | | |
|---|---|---|
| 1,422,090 | Dickie | July 11, 1922 |
| 1,572,426 | Foote | Feb. 9, 1926 |
| 1,718,398 | Zaeske | June 25, 1929 |
| 1,814,216 | Hartwell | July 14, 1931 |
| 2,166,015 | Mikkelson | July 11, 1939 |
| 2,469,865 | Crow | May 10, 1949 |
| 2,637,261 | Wale | May 5, 1953 |